(No Model.)
W. H. HORN.
CULTIVATOR AND PULVERIZER.
No. 435,584. Patented Sept. 2, 1890.
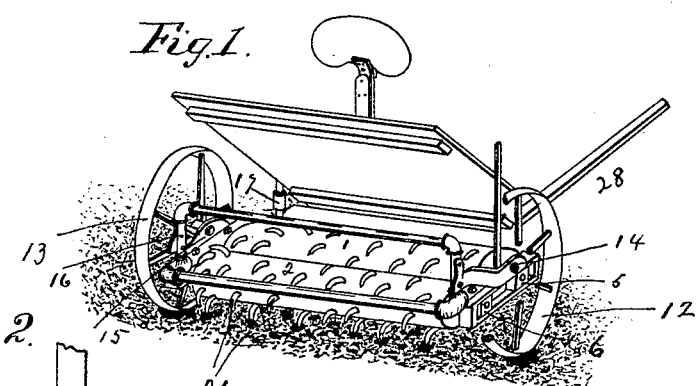
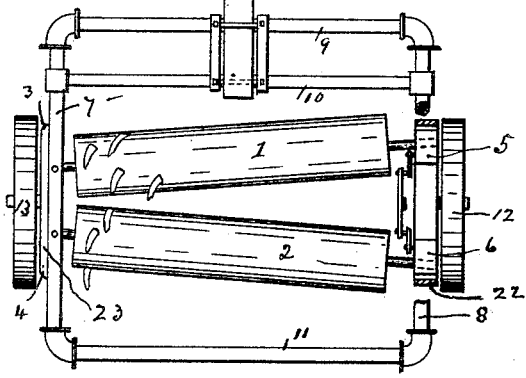
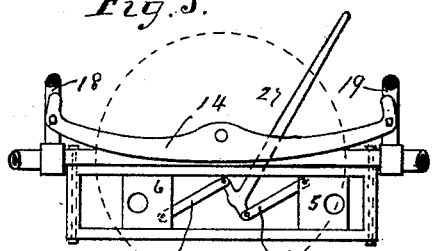
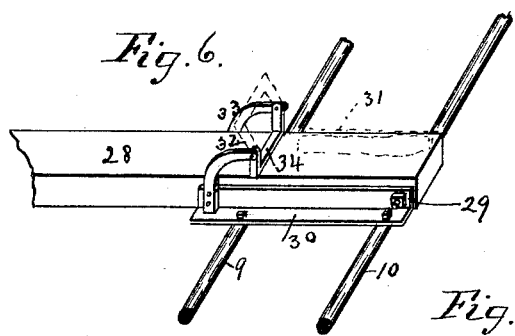
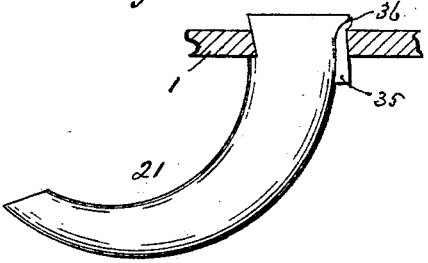
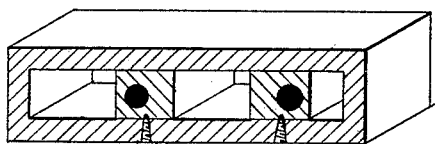
WITNESSES
C. T. Bell
Louis H. Gebhard
INVENTOR
William H. Horn
By C. D. Campbell
Attorney

UNITED STATES PATENT OFFICE.

WILLIAM H. HORN, OF NEAR BELLEFONTAINE, OHIO.

CULTIVATOR AND PULVERIZER.

SPECIFICATION forming part of Letters Patent No. 435,584, dated September 2, 1890.

Application filed March 13, 1889. Serial No. 303,173. (No model.)

*To all whom it may concern:*

Be it known that I, WILLIAM H. HORN, a citizen of the United States, and a resident of near Bellefontaine, in the county of Logan and State of Ohio, have invented a new and useful Improvement in Cultivators and Pulverizers, of which the following is a specification.

My invention relates to improvements in cultivators and pulverizers.

Figure 1 is a rear perspective view; Fig. 2, a top view with driver's seat, foot-board, &c., left off, showing my cylinders spread apart at one end to give an oblique movement to the teeth to move the soil sidewise; Fig. 3, a detail view showing the adjustable boxes and lever for operating the same; Fig. 4, a detail view showing the manner of fastening the teeth in; Fig. 5, a detail view in section, showing the pivoted boxes in which one end of the rollers is journaled; Fig. 6, a perspective detail view showing manner of attaching the tongue.

The construction and operation of my device are as follows:

Two cylinders 1 and 2 are journaled in boxes 3 4 5 6, suspended from a gas-pipe frame consisting of the end pieces 7 8 and cross-pieces 9 10 11, united by the usual elbows and unions and mounted on wheels 12 13, whose axles are journaled in the pieces 14 15, mounted on the standards 16 17 18 19 on the frame. Projecting from the face of the rollers are a set of wedge-faced curved teeth 21, which as the rollers revolve enter the ground heel first, the point of the tooth being projected backward and leaving the ground last, as set forth in my former patent.

My improvement consists, principally, in pivoting the journal-boxes at one end of the machine and in adjusting the journal-boxes at the other end so that they can be slid apart or toward each other at one end, so as to set them obliquely to the frame or leave them parallel with each other, and, further, in attaching and adjusting the tongue so that it will be rigidly or flexibly attached to the machine.

Bolted underneath the end pieces 7 8 of the frame are two rectangular pieces 22 23, in which are fitted the boxes 3 4 5 6. The boxes 3 4 are pivoted in the frame or support 22 on the pivots 24 25, while the boxes 5 6 are placed loosely in the support 23, so as to have free endwise movement. To their inside ends are connected the straps 25 26, which are attached to the ends of a pivoted T-lever 27. By moving the handle of this lever back and forth the boxes are brought toward each other or moved apart, placing the rollers parallel with each other or obliquely to each other and the frame, as shown in Fig. 2, the boxes at the other ends turning on their pivots when the rollers are spread apart at this end.

The tongue 28 of the machine is pivoted at 29 on two angle-plates 30 31, mounted on the cross-pieces 9 10 of the frame. Near the front of the angle-plates are two standards bent backward at their tops, and in the rear ends of these is pivoted a ⊔-shaped brace 34, which when swung down on top of the tongue holds the tongue rigidly down on the cross-piece 9 and prevents its turning on its pivot; but when the cultivator is to be used on ground where gullies have to be crossed this piece is swung up, as shown in dotted lines, and the tongue is free to oscillate on its pivot to allow the tongue to follow the rise of one side of the gully and the pulverizer to follow the descent of the other side.

The cylinders may be of any suitable material, and the face solid or open, though I prefer the open roller.

The shank of the teeth 21 is dovetailed into the cylinder in the form shown in Fig. 4, and fastened by a beveled key 35. On the end of the shank is a curved lip 36. When the key, which is of wrought-iron, is driven in, the point of the key, coming in contact with the the lip, is bent outward, effectually locking the key and tooth in position.

In working young wheat or corn I prefer to have my rollers parallel; but in pulverizing the ground, getting it ready to plant, I prefer to place them obliquely, as it gives the teeth a sidewise motion in the ground, moving the soil laterally, as well as stirring it and pulverizing it.

What I claim is—

1. In a cultivator and pulverizer, a wheel-frame having a guideway or box-slide at either side, in combination with the toothed cylinders 1 2, the pivoted boxes 3 4 at one end and the sliding boxes at the other end thereof, and means for actuating the sliding boxes to or from each other, substantially as shown and described.

2. The frame and the rectangular guide pieces or boxes 22 and 23, in combination with the toothed rollers, the pivoted boxes 3 4, the sliding boxes 5 6, the angle-lever 27, and the boxes 25 26, as and for the purpose set forth.

3. The combination of the frame having the angle-plates 30 31 thereon, standards 32 33, and the swinging brace 34 of the tongue 28, pivoted on the angle-plates 30 31, as and for the purpose set forth.

WILLIAM H. HORN.

Witnesses:
NED CAMPBELL,
E. K. CAMPBELL.